United States Patent [19]

Degnan et al.

[11] Patent Number: 4,869,806

[45] Date of Patent: Sep. 26, 1989

[54] PRODUCTION OF HIGH VISCOSITY INDEX LUBRICATING OIL STOCK

[75] Inventors: Thomas F. Degnan, Yardley, Pa.; Roger A. Morrison, Deptford, N.J.; Ernest W. Valyocsik, Yardley, Pa.

[73] Assignee: Mobil Oil Corp., New York, N.Y.

[21] Appl. No.: 320,814

[22] Filed: Mar. 10, 1989

Related U.S. Application Data

[63] Continuation of Ser. No. 130,599, Dec. 9, 1987, abandoned.

[51] Int. Cl.$^4$ .............................................. C10G 11/05
[52] U.S. Cl. ................................. 208/111; 208/120; 423/326; 423/328; 502/77
[58] Field of Search ................... 208/111, 120; 502/77; 423/326, 328

[56] References Cited

U.S. PATENT DOCUMENTS

| | | | |
|---|---|---|---|
| Re. 28,398 | 4/1975 | Chen et al. | 208/111 |
| 3,755,138 | 8/1973 | Chen et al. | 208/111 |
| 3,894,938 | 7/1975 | Gorring et al. | 208/111 |
| 4,081,490 | 3/1978 | Plank et al. | 208/111 |
| 4,222,855 | 9/1980 | Pelrine et al. | 208/111 |
| 4,247,388 | 1/1981 | Banta et al. | 208/111 |
| 4,397,827 | 8/1983 | Chu | 208/111 |
| 4,427,789 | 1/1984 | Miale et al. | 208/111 |
| 4,448,675 | 5/1984 | Chu | 208/111 |

*Primary Examiner*—Asok Pal
*Attorney, Agent, or Firm*—Alexander J. McKillop; Charles J. Speciale; Dennis P. Santini

[57] ABSTRACT

Waxy hydrocarbon oils, e.g., of petroleum origin, are catalytically dewaxed to produce high viscosity index lubricating oil stocks utilizing as catalyst acidic zeolite ZSM-57.

13 Claims, 2 Drawing Sheets

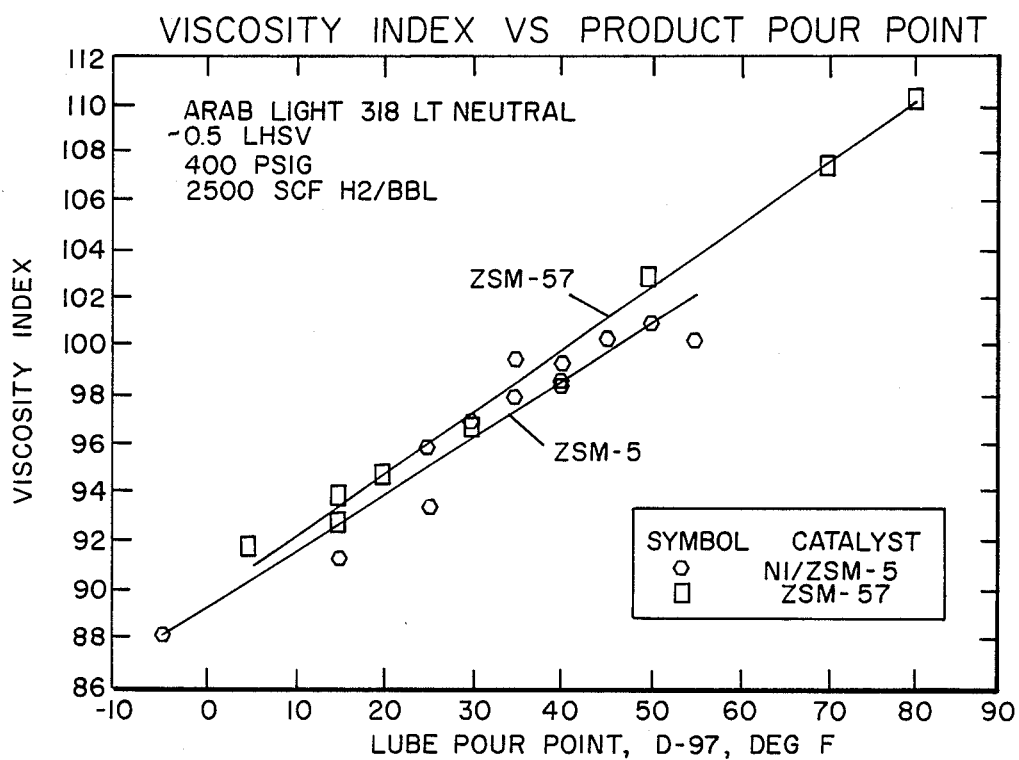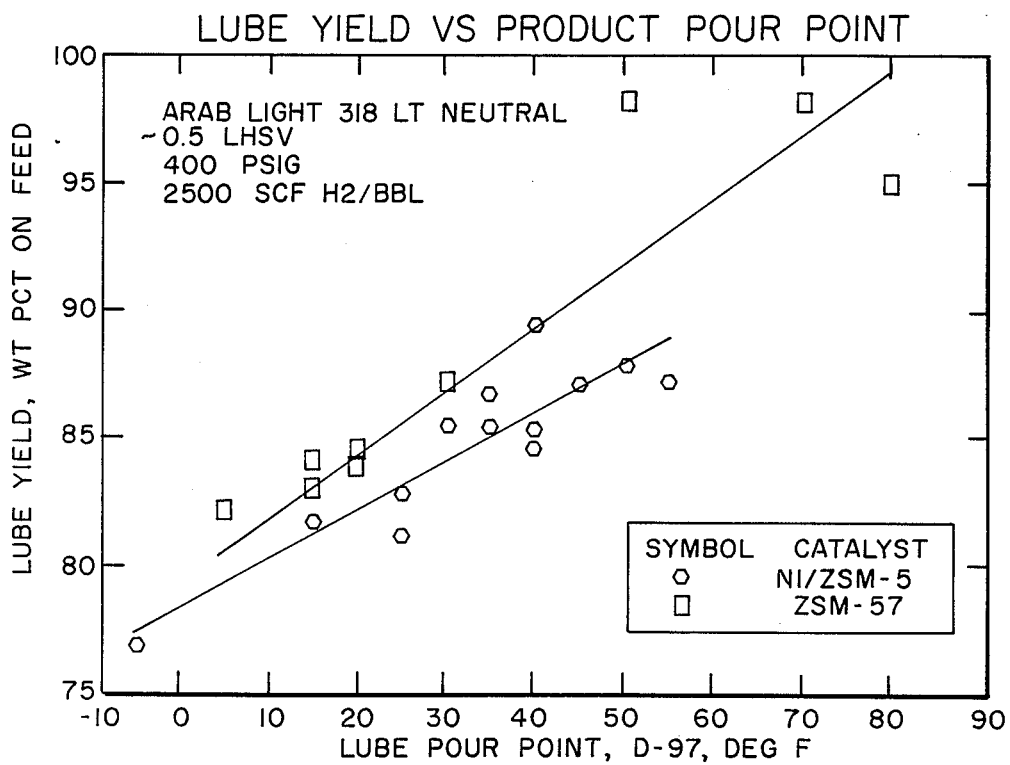

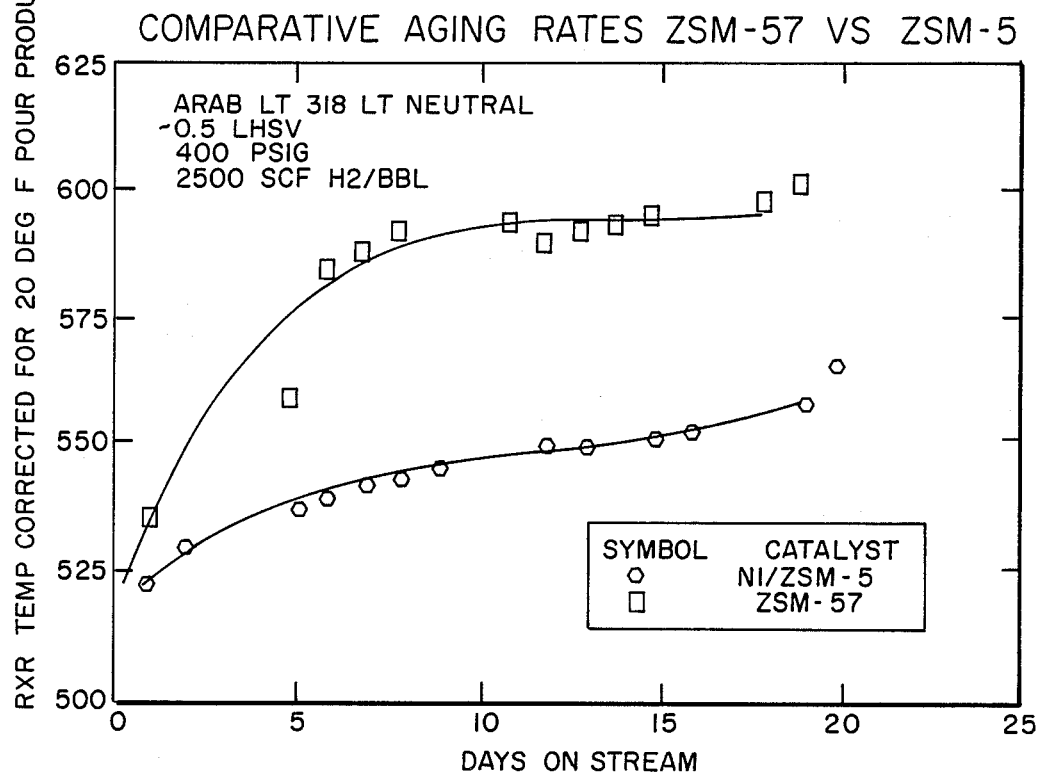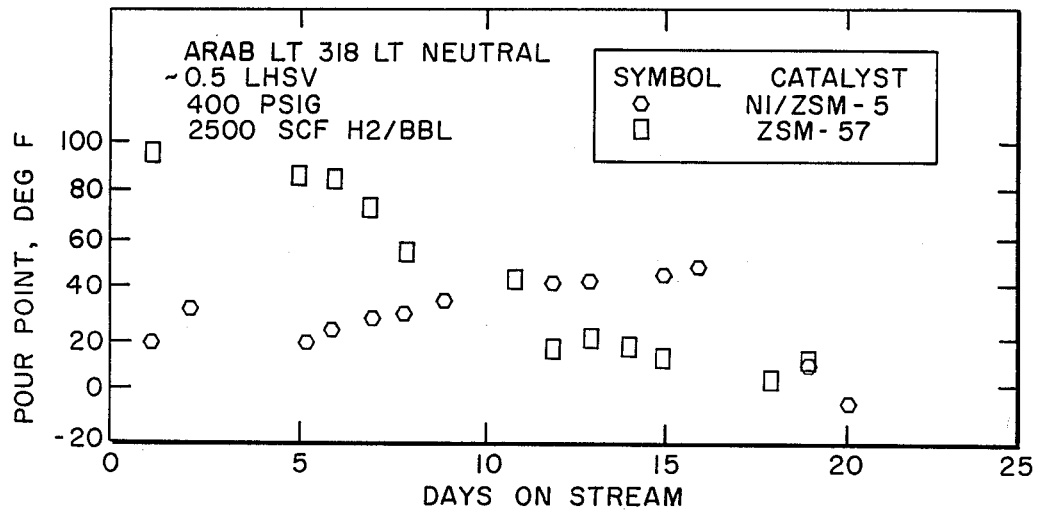

PRODUCTION OF HIGH VISCOSITY INDEX LUBRICATING OIL STOCK

This is a continuation of copending application Ser. No. 130,599, filed on Dec. 9, 1987, now abandoned.

CROSS-REFERENCE TO RELATED APPLICATIONS

Said U.S. patent application Ser. No. 130,599 is a continuation-in-part of commonly assigned copending U.S. patent application Ser. No. 121,544, filed Nov. 17, 1987, which is a continuation-in-part of commonly assigned U.S. patent application Ser. No. 944,297, filed Dec. 19, 1986.

Said U.S. patent application Ser. No. 944,297 is a continuation-in-part of commonly assigned U.S. patent application Ser. No. 807,424, filed Dec. 10, 1985, now abandoned, which is a continuation-in-part of the following commonly assigned U.S. patent applications:

| SER. No. | FILING DATE | STATUS |
| --- | --- | --- |
| 642,964 | August 21, 1984 | Now abandoned |
| 642,965 | August 21, 1984 | Now abandoned |
| 642,963 | August 21, 1984 | Now abandoned |
| 642,962 | August 21, 1984 | Now abandoned |
| 642,961 | August 21, 1984 | Now abandoned |
| 759,377 | July 26, 1985 | Now abandoned |

Said U.S. patent application Ser. No. 944,297 is also a continuation-in-part of U.S. patent application Ser. No. 759,377, which is a continuation-in-part of the following commonly assigned U.S. patent applications:

| SER. No. | FILING DATE | STATUS |
| --- | --- | --- |
| 642,964 | August 21, 1984 | Now abandoned |
| 642,965 | August 21, 1984 | Now abandoned |
| 642,963 | August 21, 1984 | Now abandoned |
| 642,962 | August 21, 1984 | Now abandoned |
| 642,961 | August 21, 1984 | Now abandoned |
| 642,930 | August 21, 1984 | Now abandoned |

The entire disclosures of the above-identified applications are expressly incorporated herein by reference.

BACKGROUND OF THE INVENTION

This invention is concerned with the manufacture of high quality lubricating oils, and in particular with lubricating oils derived from petroleum distillate fractions. It is especially directed to the preparation of low pour point lubricating oils that have a high V.I. (V.I. will be used herein to denote "viscosity index") from crude oils of high wax content. This invention is specifically directed to catalytically dewaxing a waxy distillate lubricating oil utilizing as catalyst the zeolite ZSM-57, optionally associated with a hydrogenation component, to obtain a lubricating oil of low pour point and high V.I.

Refining suitable petroleum crude oils to obtain a variety of lubricating oils which function effectively in diverse environments has become a highly developed and complex art. Although the broad principles involved in refining are qualitatively understood, the art is encumbered by quantitative uncertainties which require considerable resort to empiricism in practical refining. Underlying these quantitative uncertainties is the complexity of the molecular constitution of lubricating oils. Because lubricating oils for the most part are based on petroleum fractions boiling above about 450° F., the molecular weight of the hydrocarbon constituents is high and these constituents display almost all conceivable structure types. This complexity and its consequences are referred to in well known treatises such as "Petroleum Refinery Engineering," by W. L. Nelson, McGraw Hill Book Company, Inc., New York, N.Y., 1958 (Fourth Edition).

In general, the basic premise in lubricant refining is that a suitable crude oil, as shown by experience or by assay, contains a quantity of lubricant stock having a predetermined set of properties such as appropriate viscosity, oxidation stability and maintenance of fluidity at low temperatures. The process of refining to isolate that lubricant stock consists of a set of subtractive unit operations which removes the unwanted components. The most important of these unit operations include distillation, solvent refining and dewaxing which basically are physical separation processes in the sense that if all the separated fractions were recombined one would reconstitute the crude oil.

A refined lubricant stock may be used as siuch as a lubricant, or it may be blended with another refined lubricant stock having different properties. Or, the refined lubricant stock, prior to use as a lubricant, may be compounded with one or more additives which function, for example, as antioxidants, extreme pressure additives and V.I. improvers.

For the preparation of a high grade distillate lubricating oil stock, the current practice is to vacuum distill an atmospheric tower residuum from an appropriate crude oil as the first step. This step provides one or more raw stocks within the boiling range of about 450° to 1050° F. After preparation of a raw stock of suitable boiling range, it is extracted with a solvent, e.g., furfural, phenol, sulfolane or chlorex, which is selective for aromatic hydrocarbons, and which removes undesirable components. The raffinate from solvent refining is then dewaxed, for example, by admixing with a solvent such as a blend of methyl ethyl ketone and toluene. The mixture is chilled to induce crystallization of the paraffin waxes which are then separated from the raffinate. Sufficient quantities of wax are removed to provide the desired pour point for the raffinate.

Other processes such as hydrofinishing or clay percolation may be used if needed to reduce the nitrogen and sulfur content or improve the color of the lubricating oil stock.

Viscosity index (V.I.) is a quality parameter of considerable importance for distillate lubricating oils to be used in automotive engines and aircraft engines which are subject to wide variations in temperature. This index indicates the range of change of viscosity with temperature. A high viscosity index of 100 indicates an oil which resists becoming viscous at low temperature or becoming thin at high temperatures. Measurement of the Saybolt Universal Viscosity of an oil at 100° and 210° F., and referral to correlations, provides a measure of the V.I. of the oil. For purposes of the present invention, whenever V.I. is referred to it is meant the V.I. as noted in the Viscosity Index tabulations of the ASTM (D567), published by ASTM, 1916 Race St., Philadelphia 3, PA., or equivalent.

To prepare high V.I. automotive and aircraft oils, the refiner usually selects a crude oil relatively rich in paraffinic hydrocarbons since experience has shown that crudes poor in paraffins, such as those commonly termed "naphthene-base" crudes, yield little or no refined stock having a V.I. above about 40. Suitable stocks for high V.I. oils, however, also contain substantial quantities of waxes which result in solvent-refined lubricating oil stocks of high pour point. Thus, in general, the refining of crude oil to provide acceptably high V.I. distillate stocks ordinarily includes dewaxing to reduce the pour point.

In recent years, catalytic techniques have become available for dewaxing of petroleum stocks. A process of that nature developed by British Petroleum is described in *The Oil and Gas Journal*, dated Jan. 6, 1975, at pages 69–73. See also, U.S. Pat. No. 3,668,113.

U.S. Pat. No. Re. 28,398 (of original U.S. Pat. No. 3,700,585) describes a process for catalytic dewaxing employing a catalyst comprising zeolite ZSM-5. Such a process combined with catalytic hydrofinishing is described in U.S. Pat. No. 3,894,938. U.S. Pat. No. 3,755,138 describes a process for mild solvent dewaxing to remove high quality wax from a lube stock which is then catalytically dewaxed to specification pour point. The entire contents of these patents are incorporated by reference herein.

It is interesting to note that catalytic dewaxing, unlike prior-art dewaxing processes, although subtractive, is not a physical process but rather depends on transforming the straight chain and other waxy paraffins to non-wax materials. The process, however, is more economical and thus of industrial interest even though at least some loss of saleable wax is inherent. Commercial interest in catalytic dewaxing is evidence of the need for more efficient refinery processes to produce low pour point lubricants.

SUMMARY OF THE INVENTION

It has now been found that the catalytic dewaxing of a distillate petroleum fraction, e.g., one boiling within the approximate range of from about 450° to about 1050° F., is advantageously achieved by utilizing acidic zeolite ZSM-57 as catalyst in the operation.

The recovered dewaxed oil so produced has a V.I. considerably higher than that obtained with ZSM-5 catalyst described in the aforementioned prior art. The zeolite utilized in the process of this invention is in the hydrogen form and can be employed in conjunction with a hydrogenation component such as platinum, palladium, zinc, and the like, in the presence of hydrogen.

BRIEF DESCRIPTION OF THE DRAWINGS

FIG. 1 is a graphical comparison of V.I. versus pour point for ZSM-5 versus ZSM-57 in a hydrodewaxing operation carried out under substantially similar conditions with both catalysts;

FIG. 2 is a graphical comparison of lube yield versus product pour point for ZSM-5 versus ZSM-57 in said hydrodewaxing operation; and, FIGS. 3A and 3B are graphical summary of aging rate data for ZSM-57 in said hydrodewaxing operation.

DESCRIPTION OF THE PREFERRED EMBODIMENTS

The catalyst composition useful in the process of this invention comprises acidic zeolite ZSM-57. This catalyst and a method for its preparation are described in allowed U.S. patent application Ser. No. (Assignee Docket 4484 S), filed Nov. 17, 1987, the contents of which are incorporated by reference herein.

Zeolite ZSM-57 may have a ratio of $YO_2:Y_2O_3$ of at least 4, wherein X represents silicon and/or germanium and Y represents aluminum, boron, chromium, iron and/or gallium. Preferably, there are from greater than 8 to about 200 moles of $XO_2$ per mole of $Y_2O_3$. Preferably, $XO_2$ is silica and $Y_2O_3$ is alumina. It is to be understood that each mole of Y will be associated with one mole of a cation.

Zeolite ZSM-57 is prepared from a crystallization reaction mixture which includes a directing agent, i.e., an organic or organometallic compound which influences the morphology of the ultimately formed crystal lattice. At least a portion of the cations corresponding to the directing agent are bound to anionic sites of the crystal lattice in the as-synthesized form of the zeolite. A directing agent which is capable of influencing the formation of ZSM-57 (provided that other sufficient formation conditions are met) is an N,N,N,N',N',N'-hexaethylpentane-diammonium cation, hereinafter also referred to as Hexaethyl-DIQUAT-5. This cation may be supplied to the crystallization mixture, e.g., in the form of a bromide salt.

Zeolite ZSM-57 exhibits the X-ray diffraction lines as set forth in Table 1.

TABLE 1

| d ± delta d(Angstrom) | Intensity Range |
|---|---|
| 11.36 ± 0.23 | M-VS |
| 9.41 ± 0.19 | M-VS |
| 7.12 ± 0.15 | M-S (shoulder) |
| 6.95 ± 0.14 | M-S |
| 5.74 ± 0.12 | M |
| 5.68 ± 0.12 | W-M (shoulder) |
| 5.42 ± 0.11 | M-S |
| 4.81 ± 0.10 | W-M |
| 3.98 ± 0.08 | VW-M |
| 3.84 ± 0.08 | M-S (shoulder) |
| 3.79 ± 0.08 | VS |
| 3.64 ± 0.08 | W |
| 3.55 ± 0.08 | S |
| 3.48 ± 0.08 | S-VS |
| 3.36 ± 0.07 | W |
| 3.14 ± 0.07 | M-S |
| 3.06 ± 0.07 | W |
| 2.949 ± 0.06 | VW |
| 2.316 ± 0.05 | VW |
| 1.935 ± 0.04 | W |

The original alkali metal cations of the as-synthesized zeolite can be replaced in accordance with techniques well known in the art, at least in part, by ion exchange with other cations. Preferred replacing cations include metal ions, hydrogen ions, hydrogen precursor, e.g., ammonium, ions and mixtures thereof. Particularly preferred cations are those which render the zeolite catalytically active and include hydrogen, rare earth metals and metals of Groups IA, IIA, IIIA, IVA, IB, IIB, IIIB, IVB and VIII of the Periodic Table of the Elements.

A typical ion exchange technique involves contacting the synthetic zeolite with a salt of the desired replacing cation or cations. Examples of such salts include the halides, e.g., chlorides, nitrates and sulfates.

Zeolite ZSM-57 can be used either in the alkali metal form, e.g., the sodium or potassium form; the ammonium form; the hydrogen form or another univalent or multivalent cationic form. Prior to use, the zeolite will be subjected to thermal treatment to remove part or all of the organic constituent.

Acidic zeolite ZSM-57 utilized in the process of this invention is desirably employed in intimate combination with a hydrogenation component in an amount between about 0.1 and about 5 weight percent such as tungsten, vanadium, zinc, molybdenum, rhenium, nickel, cobalt, chromium, manganese, or a noble metal such as platinum or palladium. Such component can be exchanged into the composition, impregnated thereon or physically intimately admixed therewith. Such component can be impregnated in or onto the zeolite such as, for example, in the case of platinum, by treating the zeolite with a platinum metal-containing ion. Thus, suitable platinum compounds include chloroplatinic acid, platinous chloride and various compounds containing the platinum amine complex. Platinum, palladium and zinc are preferred hydrogenation components.

The compounds of the useful platinum or other metals can be divided into compounds in which the metal is present in the cation of the compound and compounds in which it is present in the anion of the compound. Both types of compounds which contain the metal in the ionic state can be used. A solution in which platinum metals are in the form of a cation or cationic complex, e.g., $Pt(NH_2)_4Cl_2$, is particularly useful.

Zeolite ZSM-57, especially in its metal, hydrogen and ammonium forms, can be beneficially converted to another form by thermal treatment. This thermal treatment is generally performed by heating one of these forms at a temperature of at least 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C.

Prior to its use, the ZSM-57 catalyst should be dehydrated at least partially. This can be done by heating to a temperature in the range of from about 200° C. to about 600° C. in an inert atmosphere, such as air, nitrogen, etc., and at atmospheric or subatmospheric pressures for between 1 and 48 hours. Dehydration can also be performed at lower temperature merely by placing the catalyst in a vacuum, but a longer time is required to obtain sufficient amount of dehydration. ZSM-57 is formed in a wide variety of particle sizes. Generally speaking, the particles can be in the form of a powder, a granule, or a molded product, such as extrudate having a particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

Zeolite ZSM-57 can be prepared from a reaction mixture containing sources of alkali metal ions (Z), an oxide of Y, an oxide of X, a divalent of N,N,N,N',N',N'-hexaethylpentane-diammonium cation (R), and water. The reaction mixture may comprise an appropriate selection of reactants, capable of forming the zeolite of the present invention, and having a composition falling within the following ranges:

| Reactants | Broad | Preferred |
|---|---|---|
| $SiO_2/Al_2O_3$ | 20–200 | 40–100 |
| $H_2O/SiO_2$ | 10–200 | 20–50 |
| $OH^-/SiO_2$ | 0–3 | 0.1–0.5 |
| $Z/SiO_2$ | 0–3 | 0.1–2 |
| $R/SiO_2$ | 0.01–2 | 0.1–1 | wherein R and Z are as above defined. The zeolite may have a composition, expressed in terms of moles of oxides on an anhydrous basis, as follows:

$$(0-15)R_2:(0-5)Z_2O:100SiO_2:(0.5-25)Al_2O_3$$

where R and Z are as defined above.

The divalent N,N,N,N',N',N'-hexaethylpentane-diammonium cation may be supplied by suitable compounds of the formula $$X(C_2H_5)_3N^+(CH_2)_5N^+(C_2H_5)_3X'$$

where X and X' are the same or different and are appropriate counterbalancing anions such as fluoride, chloride, bromide, iodide, hydroxide, acetate, sulfate, carboxylate, etc.

Crystallization of the zeolite can be carried out at either static or stirred conditions in a suitable reactor vessel such as, for example, polypropylene jars or teflon lined or stainless steel autoclaves. A useful range of temperature for crystallization is from about 80° C. to about 350° C. for a time of about 12 hours to about 200 days. Thereafter, the crystals are separated from the liquid and recovered. The composition can be prepared utilizing materials which supply the appropriate oxides. Such compositions may include sodium silicate, silica hydrosol, silica gel, silicic acid, sodium hydroxide, a source of aluminum, and an appropriate organic compound. It should be realized that the reaction mixture component oxides can be supplied from more than one source. The reaction mixture can be prepared either batchwise or continuously. Crystal size and crystallization time of the ZSM-57 will vary with the nature of the reaction mixture employed and the crystallization conditions.

In all cases, synthesis of the crystals of the zeolite of the present invention is facilitated by the presence of at least 0.01 wt. percent, preferably 0.10 wt. percent and still more preferably 1 wt. percent, seed crystals (based on total weight) of crystalline product. The ZSM-57 crystals can be shaped into a wide variety of particle sizes. Generally speaking, the particles can be in the form of a powder, a granule, or a molded product, such as an extrudate having particle size sufficient to pass through a 2 mesh (Tyler) screen. In cases where the catalyst is molded, such as by extrusion, the crystals can be extruded before drying or partially dried and then extruded.

As in the case of many other zeolite catalysts, it may be desired to incorporate the ZSM-57 with a matrix material which is resistant to the temperatures and other conditions employed in the dewaxing process herein. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjunction with the ZSM-57, i.e., combined therewith, which is catalytically active in dewaxing is within the scope of this invention. Inactive materials are also contemplated as they may serve as diluents to control the amount of conversion in a given dewaxing operation. Frequently, crystalline silicate materials have been incorporated into naturally occurring clays, e.g., bentonite and kaolin. These materials, i.e., clays, oxides, etc., function, in part, as binders for the catalyst. It is desirable to provide a catalyst having good crush strength since in a petroleum refinery the catalyst is often subject to rough handling which tends to break the catalyst down into powder-like materials which cause problems in processing.

Naturally occurring clays which can be composited with ZSM-57 include the montmorillonite and kaolin families which include the sub-bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, ZSM-57 can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. Mixtures of these components can also be used. The relative proportions of finely divided crystalline silicate ZSM-57 and inorganic oxide gel matrix vary widely with the crystalline silicate content ranging from about 1 to about 90 percent by weight, and more usually in the range of about 2 to about 80 percent by weight, of the composite.

The charge stock used in the process of this invention includes hydrocracked petroleum oils boiling within the aforenoted range as well as other processed heavy oils whether derived from tar sands, coal or from other sources. The boiling points herein referred to are boiling points at atmospheric pressures and may be determined by vacuum assay in a manner known to those skilled in the art.

In a preferred embodiment of this invention, a viscous distillate fraction of crude petroleum oil isolated by vacuum distillation of a reduced crude from atmospheric distillation is solvent refined by counter current extraction with at least an equal volume (100 volume percent) of a selective solvent such as furfural. It is preferred to use from about 1.5 to about 2.5 volumes of solvent per volume of oil. The raffinate is then subjected to catalytic dewaxing by mixing with hydrogen and contacting at elevated temperature with a catalyst comprising zeolite ZSM-57, preferably associated with a hydrogenation component as previously described.

In some instances, it may be desirable to partially dewax the solvent-refined stock by conventional solvent dewaxing techiques prior to catalytic dewaxing. The higher melting point waxes so removed are those of greater hardness and higher market value than the waxes removed in taking the produce to a still lower pour point.

In general, hydrodewaxing conditions include a temperature between about 500° and about 850° F., a pressure between about 100 and about 300 psig and preferably between about 200 and about 1000 psig. The liquid hourly space velocity is generally between about 0.1 and about 10 and preferably between about 0.5 and about 4 and the hydrogen to feedstock ratio is generally between about 400 and about 8000 and preferably between about 800 and about 4000 standard cubic feet (scf) of hydrogen per barrel of feed.

The catalytic dewaxing process of this invention can be conducted by contacting the feed to be dewaxed with a fixed stationary bed or with a transport bed of the ZSM-57 catalyst, as desired. A simple, and therefore preferred, configuration is a trickle-bed operation in which the feed is permitted to trickle through a stationary fixed bed, preferably in the presence of hydrogen. With such a configuration, it is of considerable importance in order to obtain the benefits of this invention to initiate the reaction with fresh catalyst at a temperature of less than about 600° F. This temperature is, of course, raised as the catalyst ages in order to maintain catalytic activity. In general, the run is terminated at an end-of-run temperature less than about 750° F., at which time the catalyst can be regenerated by contact at elevated temperature with hydrogen gas, for example.

In the examples of the invention which follow, Example 1 illustrates the preparation of alumina-bound HZSM-57 and Example 2 illustrates a catalytic dewaxing process employing the resulting zeolite.

EXAMPLE 1

The HZSM-57 was synthesized in a 300 ml autoclave using Hexaethyl-Diquat-5 Bromide as the directing agent. The directing agent was prepared by refluxing overnight 1,5-dibromopentane with excess triethylamine in absolute ethanol.

In the crystalline reaction mixture, Q-brand sodium silicate (PQ Corporation: 27.8% $SiO_2$; 8.4% $Na_2O$) was employed as the silica source and $Al_2(SO_4)_3 \cdot 18H_2O$ was used as the alumina source.

A solution A was prepared by dissolving 50.0 g Q-brand sodium silicate in 93.74 g deionized water. After the sodium silicate dissolution was complete, 10.0 g of Hexaethyl-DIQUAT-5 Bromide was dissolved in the silicate solution.

Another solution B was prepared by dissolving 2.57 g $Al_2(SO_4)_3 \cdot 18H_2O$ and 2.97 g concentrated $H_2SO_4$ in 40.0 g deionized water.

Solutions A and B were then mixed directly into a 300 ml stainless-steel autoclave until the hydrogel was of uniform consistency.

The composition of the aluminosilicate hydrogel produced possessed the following mole ratios:

| $\frac{SiO_2}{Al_2O_3}$ : | $\frac{H_2O}{SiO_2}$ : | $\frac{OH^-}{SiO_2}$ : | $\frac{Na^+}{SiO_2}$ : | $\frac{R}{SiO_2}$ |
|---|---|---|---|---|
| 60:40:0.30:0.59:0.10 | | | | |

The autoclave was sealed and heating and stirring begun immediately. Zeolite synthesis was carried out over a period of 4 days with stirring (400 rpm) and with the 300 ml autoclave operating at 170° C. at autogenous pressure.

At the termination of the run, the autoclave was quenched in a water-ice bath prior to filtration of the ZSM-57 aluminosilicate. After washing and drying under an infrared heat lamp, the crystalline product was submitted for x-ray powder diffraction scans which confirmed its structure as that of ZSM-57.

The resulting as-synthesized zeolite had a silica-alumina ratio of ratio of 48.7, contained 0.67% sodium and exhibited an x-ray diffraction pattern characteristic of ZSM-57. The zeolite was calcined in flowing air at a heating rate of 3° C./min to 500° C. and held at this temperature for 12 hours to remove the organic directing agent. Approximately 9 grams of this calcined zeolite was placed in a beaker and ion exchanged with 100 ml of a 1.0N $NH_4NO_3$ solution for six hours at 80° C. with stirring. The $NH_4^+$-exchanged ZSM-57 was filtered, washed twice with deionized water, then dried under an infrared heat lamp. Following the drying step, the zeolite was calcined in air at 1° C./min to 538° C. in air and held in air at this temperature for one hour to convert the zeolite to the hydrogen form. The alpha* activity of the catalyst in the H-form was 320.

*Alpha value, or alpha activity, is a measure of normal hexane cracking conversion relative to a silica-alumina cracking catalyst. The alpha test is described in U.S. Pat. No. 3,354,078 and well as in *J. Catalysis*, 4, pp. 527–529 (1965) and *J. Catalysis*, 6, 390–396 (1980).

Eight grams of the HZSM-57 (98.2 wt.% ash) was admixed with 4.2 grams of a commercial gamma alumina (99.3 wt.% ash). This physical mixture was then ground in a mortar and pestle and pelleted using a conventional tabletting machine. The resulting tablets were ground and sieved to 14.40 mesh (Tyler).

EXAMPLE 2

The alumina-bound HZSM-57 catalyst from Example 1 was loaded into a ⅜" ID microreactor and pretreated in nitrogen to 650° F. The catalyst was then streamed with an Arab Light light neutral raffinate at 0.5 LHSV, 400 psig, 2500 scf $H_2$/BBL at an initial temperature of 498° F. Properties of the Arab Light light neutral raffinate are set forth in Table 2 as follows:

TABLE 1

| | |
|---|---:|
| H—NMR, wt. % | 13.600 |
| Nitrogen-Chemiluminesce, ppm | 49.000 |
| Sulfur, wt. % | 0.930 |
| API Gravity | 30.400 |
| Refractive Index Liquids | 1.464 |
| Flash Point (Cleveland Open Cup) | 446.000 |
| Total Acid No. | 0.120 |
| Bromine No. | 0.900 |
| Kinematic Viscosity at 100° C., cs | 5.553 |
| Kinematic Viscosity at 300° F., cs | 2.489 |
| Furfural (ppm) | 7.000 |
| Metals | |
| Nickel, ppm | 0.000 |
| Vanadium, ppm | 0.000 |
| Iron, ppm | 0.600 |
| Copper, ppm | 0.040 |
| Sodium, ppm | 5.000 |

The reactor temperature was then raised progressively over the next 19 days to attain and maintain a 20° F. pour point product.

FIG. 1 plots V.I. against the pour point response of the ZSM-57 based catalyst and compares this to a Ni/ZSM-5 catalyst for dewaxing the same feedstock. The conditions used in the ZSM-5 hydrodewaxing run were essentially identical. These data demonstrate that ZSM-57 produces a higher viscosity index material than ZSM-5 at equivalent pour points. Table 3 below summarizes the lube properties of the ZSM-57 hydrodewaxed products.

TABLE 3

Properties of the ZSM-57 Hydrodewaxed Products

| Reactor temp., °F. | 581 | 574 | 592 | 592 | 606 |
|---|---|---|---|---|---|
| LHSV | 0.45 | 0.45 | 0.45 | 0.45 | 0.45 |
| Days on Stream | 11 | 8 | 13 | 12 | 18 |
| Pour Point, °F. | | | | | |
| Herzog | 56 | 41 | 20 | 16 | 3 |
| ASTM D-97 | 50 | 30 | 20 | 15 | 5 |
| KV at 40° C., cs | 36.30 | 39.98 | 39.01 | 39.41 | 40.92 |
| KV at 100° C., cs | 5.886 | 6.014 | 5.976 | 5.999 | 6.105 |
| Lube Yield, wt % | 98.5 | 87.3 | 83.9 | 82.8 | 82.0 |
| V.I. | 103.0 | 96.8 | 94.7 | 93.9 | 91.8 |

Data plotted in FIG. 2 compares the lube yield against product pour point data for the ZSM-57 and ZSM-5 catalysts. These data show that the lube yields from the ZSM-57 catalyst are higher than those from the ZSM-5 catalyst when the product pour point is greater than 10° F.

FIG. 3 summarizes the aging rate data from the ZSM-57 and the ZSM-5 hydrodewaxing operations.

What is claimed is:

1. A process for catalytically dewaxing a waxy hydrocarbon oil to provide a dewaxed lubricating oil which comprises contacting said oil under catalytic dewaxing conditions with a catalyst comprising acidic zeolite ZSM-57 to provide said dewaxed lubricating oil.

2. The process of claim 1 wherein said contacting is effected in the presence of hydrogen.

3. The process of claim 1 wherein said contacting is effected in the presence of hydrogen and said zeolite is associated with a hydrogenation component.

4. The process of claim 3 wherein said hydrogenation component is a metal species selected from the group consisting of platinum, palladium and zinc.

5. The process of claim 1 wherein said waxy hydrocarbon oil boils within the approximate range of from about 450° to about 1050° F.

6. The process of claim 5 wherein said waxy hydrocarbon oil is a waxy solvent-refined stock.

7. The process of claim 1 carried out at a temperature between about 500° and about 850° F.

8. The process of claim 1 carried out in the presence of hydrogen, wherein the amount of hydrogen is between about 400 and about 8000 standard cubic feet of hydrogen per barrel of feedstock.

9. The process of claim 1 carried out at a pressure of between about 100 and about 3000 psig and a liquid hourly space velocity of from about 0.1 to about 10.

10. The process of claim 9 carried out at a pressure of between about 200 and about 1000 psig and a liquid hourly space velocity of from about 0.5 and about 4.

11. A process for catalytically dewaxing a waxy hydrocarbon oil to provide a dewaxed lubricating oil which comprises contacting said oil under catalytic dewaxing conditions with a catalyst to provide said dewaxed lubricating oil, said catalyst comprising an acidic zeolite having a molar ratio of $XO_2:Y_2O_3$ of at least 4, wherein X represents silicon and/or germanium and Y represents aluminum, boron, chromium, iron and/or gallium, said porous crystalline zeolite having at least the X-ray diffraction lines as set forth in Table 1 of the specification.

12. The process of claim 11 wherein the zeolite possesses a silica to alumina mole ratio of at least about 4.

13. The process of claim 11 wherein the zeolite as-synthesized has the composition, expressed in terms of moles of oxides on an anhydrous basis, as follows:

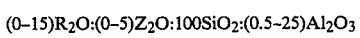

(0–15)$R_2O$:(0–5)$Z_2O$:100$SiO_2$:(0.5–25)$Al_2O_3$ where R is a cation of the formula

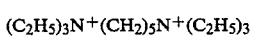

$(C_2H_5)_3N^+(CH_2)_5N^+(C_2H_5)_3$ and Z is an alkali metal ion.

* * * * *

UNITED STATES PATENT AND TRADEMARK OFFICE
CERTIFICATE OF CORRECTION

PATENT NO. : 4,869,806
DATED : September 26, 1989
INVENTOR(S) : T.F. Degnan et al.

It is certified that error appears in the above-identified patent and that said Letters Patent is hereby corrected as shown below:

Col. 2, line 22      "siuch" should be --such--
Col. 3, line 58      "summary" should be --summaries--
Col. 4, line 1      "$YO_2:Y_2O_3$" should be --$XO_2:Y_2O_3$--
Col. 3, lines 66-67      "(assignee Docket 4484 S)" should be --121,544--
Col. 7, line 55      "300" should be --3000--

Signed and Sealed this

Eighteenth Day of December, 1990

Attest:

HARRY F. MANBECK, JR.

Attesting Officer      Commissioner of Patents and Trademarks